Patented July 18, 1950

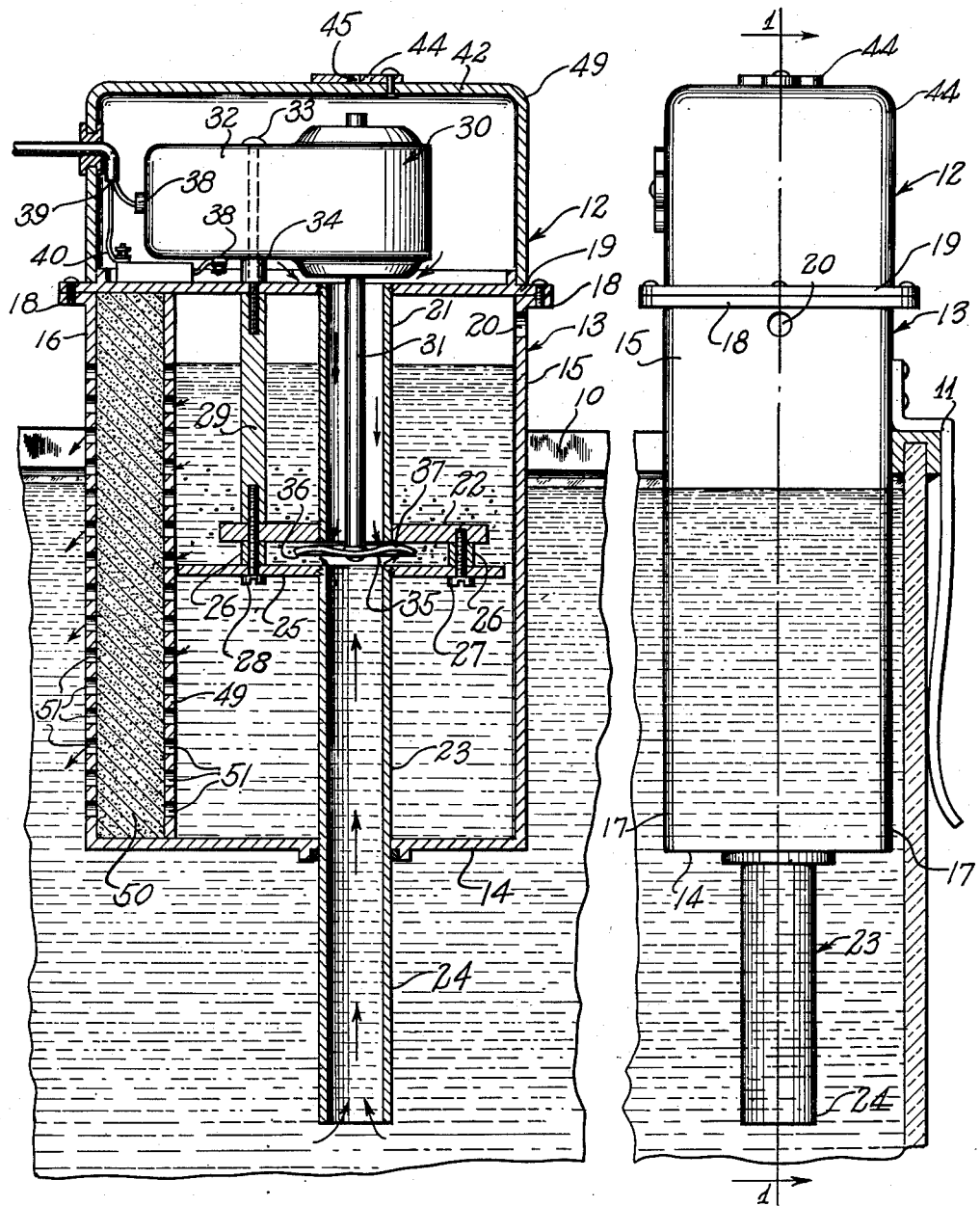

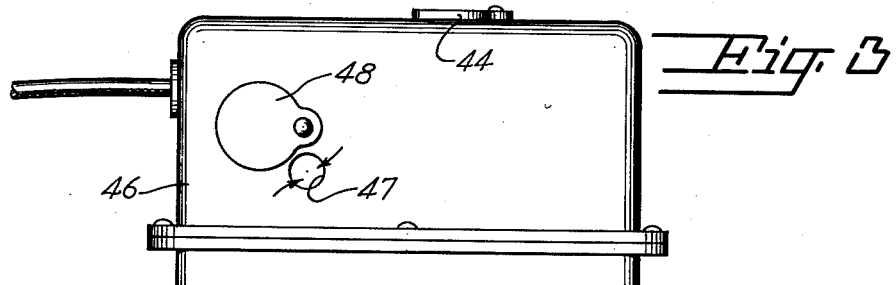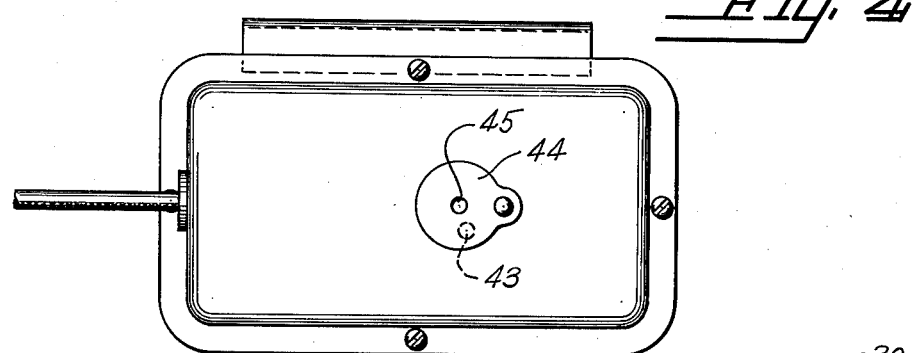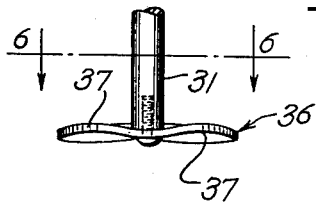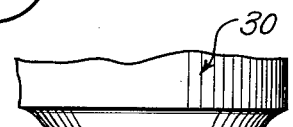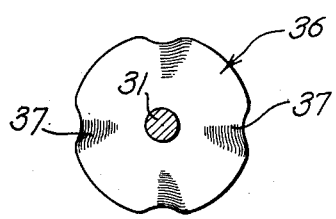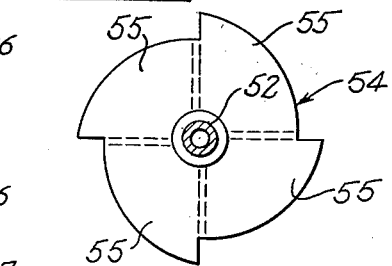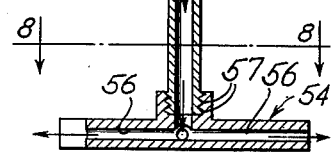

2,515,538

UNITED STATES PATENT OFFICE 2,515,538

WATER AERATOR, FILTER, AND HEATER

Byron T. Wall, Flushing, N. Y.

Application October 25, 1948, Serial No. 56,397

3 Claims. (Cl. 210—16)

This invention relates to a water aerator, filter and heater, and it consists in the constructions, arrangements and combinations herein described and claimed.

It is an object of the invention to provide a simple device for use in aquariums and the like for restoring free oxygen, removing carbonic acid and filtering the water, as well as heating it, as may be required.

It is also an object of the invention to provide a device of the character stated, which is of a portable nature readily placed within and suspended from a wall of an aquarium or other receptacle, as well as being readily removed therefrom.

A still further object of the invention is the provision of a device wherein an agitator means is provided for creating a circulation of air through a body of turbulent water for the purpose of obtaining free oxygen in said water, at the same time releasing carbonic acid gas; and also providing means for heating the water, as may be desired at times.

Additional objects, advantages and features of invention will be apparent from the following description considered in conjunction with the accompanying drawings, wherein, Figure 1 is a vertical section through the device, Figure 2 is a view in elevation at right angles to Figure 1 and illustrating the manner of suspending the device within an aquarium, Figure 3 is a fragmentary elevation of the device, illustrating an air vent and control means, Figure 4 is a top plan view of a further air vent and control means, Figure 5 is a fragmentary side elevation of an agitator employed with the device, Figure 6 is a cross section on the line 6—6 of Figure 5, Figure 7 is a fragmentary sectional view of a modified form of agitator, and, Figure 8 is a cross section on the line 8—8 of Figure 7.

Attention is now invited to Figures 1 and 2 of the drawings, wherein there is shown a portion of aquarium or the like 10, from a wall of which there is suspended by means of a bracket 11, the aerator device generally indicated by the reference character 12.

The aerator 12 comprises a receptacle 13 which may be of any suitable size and shape, but as here shown, is of rectangular shape defined by a bottom wall 14, end walls 15 and 16 and side walls 17. The walls 15, 16 and 17 are provided with a circumscribing flange 18 for mounting of a top closure wall 19. The top wall 19 is formed with a threaded opening for securement of an air inlet tube 21 which extends downwardly into the receptacle a suitable distance and has mounted on the lower end thereof a plate 22. The end wall 15 has an air vent 20 formed therein immediately below the closure plate 19 and establishes communication with the atmosphere.

A water inlet tube 23 is suitably mounted in an opening formed in the bottom wall 14, the lower end extending below the receptacle into water within the aquarium, while the upper end stops short of the air tube 21 and has fixed thereon a plate 25. The tubes 21 and 23 are in axial alignment as clearly shown in Figure 1, the plates 22 and 25 being in parallel spaced relation by means of spacer blocks 26 and held in such position by means of bolts 27 and 28. It will thus be seen that an open restricted chamber is provided for a purpose as will be explained. The bolt 28 is of a length to pass through the plate 22 so as to threadedly engage a rod 29 which functions as a support for the assembly, as will now be described.

The closure plate 19 is formed with an opening in registry with a threaded aperture in the rod 29. An electric motor 30 is employed, the driven shaft 31 of which is disposed centrally of the air tube 21, the shaft being of a length to project slightly beyond the plate 22. The motor includes a casing 32 which is provided with an opening in registry with the aperture of the plate 19 and the rod 29 and a bolt 33 extended through the apertures and engaged in the rod 29 secure the motor to the closure plate 19, but preferably a spacer block 34 is interposed between the motor casing and the closure plate. If additional support for the motor is required, the parts 26, 28 29, 33 and 34 may be duplicated.

An impeller 35 is secured to the lower end of the shaft 31 and is positioned medially in the chamber 36 between the plates 22 and 25 axially of the air inlet tube 21 and the water inlet tube 23. As best seen in Figures 5 and 6, the impeller is of substantially circular form, of a diameter greater than the openings of the pipes 21 and 23. The periphery of the body of the impeller is formed with oppositely disposed undulations 37, for a purpose to be described. The motor 30 includes binding posts 38 for connection of wires 39 from a suitable source of electric current, and if desired, a thermostat 40 may be interposed in one of the wires, as shown.

A closure cover 41 of dimensions so as to house the motor 30 is employed, adapted to rest upon the top wall 19, as shown in Figure 1. Upon the top wall 42 of the cover an opening 43 is formed above the motor, the opening being of small size and controlled by means of a pivoted plate 44. The plate 44 is formed with a vent opening 45 adapted to register with the opening 43 at times. A side wall 46 of the closure cover is formed with an opening 47 of greater dimensions than the opening 43 and the opening 47 is likewise controlled by a pivoted plate 48.

In order that the water in an aquarium or other receptacle may be filtered, the receptacle 13 is formed with a vertically disposed partition wall 49 in spaced relation to the end wall 16, and within the compartment thus provided, a suitable filtering material 50 is disposed. The wall 16 and the partition wall 49 are each formed with a multiplicity of openings 51 for passage of water through the filtering material, as will be described.

The operation of the device is substantially as follows, the device being suspended within an aquarium as shown in Figures 1 and 2. When the motor 30 is energized, the shaft 31 and the impeller 35 will be rapidly rotated, the impeller rotating within the chamber 36. By reason of the alternate arrangement of the undulations 37 of the impeller, suction will be created in the air tube 21 drawing air downwardly therethrough for discharge into the restricted chamber 36 and simultaneously therewith water is drawn from the aquarium upwardly through the tube 23 and likewise discharged into the chamber 36. The air passing into the body of turbulent water, free oxygen is obtained and at the same time carbonic acid gas is released from the water which may pass through the vent 20 and exits to the atmosphere. From the chamber 36 the water passes into the receptacle to a level above that of the water level in the aquarium, and thence forced through the openings of the partition 49 into the filtering material 50 and outwardly through openings 51 in the wall 16 back into the aquarium. The operation is continued for a period of time, and if desired the device may be moved along the wall of the aquarium without stopping operations.

Where a fine aeration of water is desired, a construction of impeller 52 as shown in Figures 7 and 8 is employed. In this form of the device, the motor shaft 52 is hollow, having a plurality of air inlet openings 53. The impeller 54 has a plurality of vanes 55 arranged in alternate fashion and between said vanes air duct 56 is formed, the latter extending radially from a hub 57 of the impeller, the latter being in communication with the hollow shaft 52.

Air passing into the closure cover 41 may be regulated by means of the control plates 44 and 48, and by closing the latter plate for a period of time, it will be apparent that air within the closure cover will become heated by means of the motor and thus the heated air will be drawn into the water to heat the same, to an extent, as may be required during winter time.

While I have shown and described preferred forms of the device, this is by way of illustration only, and I consider as my own, all such modifications in construction as fairly fall within the scope of the appended claims.

I claim:

1. A combined water aerator and filter comprising a receptacle having a circumscribing wall, a portion of said wall having a multiplicity of openings formed therein, an inner wall spaced from said portion of wall forming a compartment for a filtering material, said inner wall having a multiplicity of openings for passage of water into said compartment, said receptacle further having a water inlet tube extending from a point intermediate of the receptacle to a point outwardly thereof, an air inlet tube having communication exteriorly of the receptacle and being arranged axially with the water tube but stopping short thereof, a plate mounted on the adjacent ends of said tubes defining a restricted open chamber, a motor carried by the receptacle and including a driven shaft disposed within the air tube, an impeller mounted on said shaft and disposed within the restricted chamber for drawing water upwardly through the water tube for discharge into said restricted chamber and simultaneously drawing air downwardly into the restricted chamber and the turbulent body of water in said chamber, and means for suspending said receptacle within a container.

2. A combined water aerator, filter and heater comprising a receptacle having a circumscribing wall, a portion of said wall having a multiplicity of openings formed therein, an inner wall spaced from said portion of the wall forming a compartment for a filtering material, said inner wall having a multiplicity of openings formed therein for passage of water into said compartment, said receptacle further having a water tube extending from a point intermediate of the receptacle to a point outwardly thereof, an air tube having communication exteriorly of the receptacle and being arranged axially with the water tube but stopping short thereof, a plate mounted on the adjacent ends of said tubes defining a restricted open chamber, a closure cover for the receptacle, an electric motor mounted on said closure, means for energizing the motor, said motor having a driven shaft disposed within said air tube, an impeller fixed to said shaft and positioned within the restricted chamber for drawing water upwardly through the water tube for discharge into the restricted chamber and simultaneously drawing air downwardly through the air tube into the restricted chamber and the turbulent body of water produced in said chamber upon rotation of the impeller, a closure cover disposed over the motor and that end of the air tube having communication with the exterior of the receptacle and means for suspending said receptacle within a container.

3. The structure of claim 2 in which said closure cover includes air inlet openings and swingable plates for controlling passage of air through said openings.

BYRON T. WALL.

REFERENCES CITED

The following references are of record in the file of this patent:

UNITED STATES PATENTS

| Number | Name | Date |
|---|---|---|
| 1,824,823 | Kump | Sept. 19, 1931 |
| 2,137,397 | Haldeman | Nov. 22, 1938 |
| 2,151,225 | Newton | Mar. 21, 1939 |
| 2,194,037 | Thuma | Mar. 19, 1940 |
| 2,253,516 | Haldeman | Aug. 26, 1940 |
| 2,275,428 | Haldeman | Mar. 10, 1942 |
| 2,433,592 | Booth | Dec. 30, 1947 |

FOREIGN PATENTS

| Number | Country | Date |
|---|---|---|
| 466,143 | Great Britain | May 24, 1937 |